United States Patent
Duren et al.

(10) Patent No.: US 7,377,357 B2
(45) Date of Patent: May 27, 2008

(54) MARINE SEISMIC ACQUISITION METHOD AND APPARATUS

(75) Inventors: Richard E. Duren, Conroe, TX (US); Mark A. Meier, Houston, TX (US)

(73) Assignee: Exxon Mobil Upstream Research Co., Houston, TX (US)

( * ) Notice: Subject to any disclaimer, the term of this patent is extended or adjusted under 35 U.S.C. 154(b) by 194 days.

(21) Appl. No.: 10/540,132

(22) PCT Filed: Oct. 10, 2003

(86) PCT No.: PCT/US03/32256

§ 371 (c)(1), (2), (4) Date: Jun. 21, 2005

(87) PCT Pub. No.: WO2004/065986

PCT Pub. Date: Aug. 5, 2004

(65) Prior Publication Data

US 2006/0076183 A1    Apr. 13, 2006

(51) Int. Cl.
*G01V 1/04* (2006.01)

(52) U.S. Cl. ............ 181/121; 181/120; 181/118; 181/119; 181/108

(58) Field of Classification Search .......... 181/121, 181/120, 118, 119, 108, 112, 111, 115; 367/15, 367/21, 32, 141, 160
See application file for complete search history.

(56) References Cited

U.S. PATENT DOCUMENTS

| | | | | | |
|---|---|---|---|---|---|
| 3,384,868 | A | * | 5/1968 | Brown et al. ............ | 367/143 |
| 4,016,952 | A | * | 4/1977 | Reed et al. ............ | 181/118 |
| 4,153,134 | A | * | 5/1979 | Yang ............ | 181/120 |
| 4,578,784 | A | * | 3/1986 | Mifsud ............ | 367/143 |
| RE32,683 | E | * | 5/1988 | Ray ............ | 367/23 |
| 4,937,793 | A | * | 6/1990 | Shuck et al. ............ | 367/24 |
| 4,991,685 | A | * | 2/1991 | Airhart ............ | 181/106 |
| 5,853,905 | A | * | 12/1998 | So et al. ............ | 428/690 |
| 5,894,451 | A | * | 4/1999 | DeJaco et al. ............ | 367/143 |

(Continued)

OTHER PUBLICATIONS

Galbraith, J. M., and Millington, G. F. (1979) "Low Frequency Recovery in the Inversion of Seismograms": *Journal of the CSEG*, v. 15, p. 30-39.

(Continued)

*Primary Examiner*—Lincoln Donovan
*Assistant Examiner*—Forrest Phillips

(57) ABSTRACT

A marine seismic source method capable of retaining low frequencies is disclosed. One embodiment of the method comprises a seismic source that generates an up-going wave and first down-going wave with opposite polarity. The up-going wave reflects off the ocean surface as a second down-going wave having the same polarity as the first down-going wave and the first and second down-going waves combine substantially in-phase to form a third down-going wave. A source apparatus to accomplish the method is also disclosed. One source apparatus embodiment comprises a device wherein at least part of the device is below the surface of the water and the device is adapted to cause oscillations below the surface of the water, and means for oscillating the device in the water to create an up-going wave and a first down-going wave and the up-going wave has reverse polarity relative to the first down-going wave.

20 Claims, 6 Drawing Sheets

U.S. PATENT DOCUMENTS 6,091,668 A * 7/2000 Barber, Sr. .................... 367/15
6,230,840 B1 * 5/2001 Ambs ......................... 181/113
6,678,207 B2 1/2004 Duren ......................... 367/24

OTHER PUBLICATIONS

Lavergne, M., and Willm, C. (1977) "Inversion of Seismograms and Pseudovelocity Logs": *Geophysical. Prosp.*, v. 25, p. 231-250.

Lindseth, R. O. (1979) "Synthetic Sonic Logs-A Process for Stratigraphic Interpretation": *Geophysics*, v. 44, p. 3-26.

Oldenburg, D. W., Scheuer, T., and Levy, S. (1983) "Recovery of the Acoustic Impedance from Reflection Seismograms": *Geophysics*, v. 48, p. 1318-1337.

Trantham, E. Clark (1993) "Minimum Uncertainty Filters for Pulses": *Geophysics*, v. 58, p. 853-862.

* cited by examiner

MARINE SEISMIC ACQUISITION METHOD AND APPARATUS

FIELD OF THE INVENTION

This invention generally relates to the field of seismic prospecting. More particularly, this invention relates to the acquisition of low frequency seismic data and a marine seismic source capable of providing low frequency seismic waves.

BACKGROUND

Marine seismic exploration typically employs a seismic acquisition system to acquire seismic data. The seismic acquisition system includes a source, which initiates a seismic wave, sensors, which detect the seismic wave, and other components. The seismic wave propagates from the source through the water and subsurface where it illuminates subsea geologic formations. As it illuminates interfaces or boundaries, part of the seismic wave is returned or reflected back through the earth in the up-going direction as a primary reflection. A portion of this reflected seismic wave is detected by the sensors of the seismic acquisition system, converted into electrical signals, and recorded as seismic data for subsequent processing. An analysis of these recorded data or signals makes it possible to estimate the structure, position, impedance, fluid type, and lithology of subsea geologic formations, among other parameters, thereby completing an important step in the exploration process.

FIG. 1 shows a simplified example of a typical marine seismic acquisition system. A first ship 1 tows a seismic source 2 several meters below the surface 3 of the ocean. The seismic source 2 is activated to produce a down-going seismic wave 4d that is at least partially reflected by a subsea interface or boundary 5. The up-going reflected seismic wave 4u then travels toward the sensors 6 and is measured.

The sensors 6 used in typical marine seismic exploration include pressure sensors and/or motion (displacement, velocity, acceleration, or higher temporal derivatives of displacement) sensors. Typically, pressure sensors are hydrophones and motion sensors are geophones that usually measure particle velocity or acceleration. Hydrophones measure a scalar pressure and are not sensitive to the propagation direction of a seismic wave. Geophones, which might be vertically oriented, provide a measurement in the direction of orientation whose polarity depends on whether the direction of propagation is up-going or down-going. The amplitude of a geophone response is also related to the angle of the propagation relative to the sensitive direction of a geophone. If a seismic wave is recorded by a hydrophone and a vertically oriented geophone that have identical impulse responses, then a polarity comparison between the hydrophone and geophone recordings can determine whether the wave is propagating in the up-going or down-going direction. Hydrophones and geophones disposed at the seafloor are typically used in pairs when collecting seismic data. However, hydrophones, unlike geophones, can measure seismic data anywhere in the water column. This invention applies to motion sensors positioned anywhere in the water column including the seafloor or surface.

In another type of marine seismic surveying, the sensors 6 are located at regular intervals in one or more ocean bottom cables (OBC) 7 that are arranged on the seafloor 9. When necessary, a second ship 8 is used to move the OBC 7 to a new position on the seafloor 9. Several miles of OBC 7 are typically deployed along the seafloor 9, and several OBCs are typically deployed in parallel arrangements. OBC 7 arrangements are particularly well suited for use in certain zones (such as zones cluttered with platforms or where the water is very shallow) and where the use of ship-towed hydrophone arrays (which are located proximate the ocean surface 3 and are typically referred to as "streamers") are not practical. In another type of seismic surveying, sensor packages, often containing a hydrophone and one or several geophones, are deployed on the ocean bottom as separate stations. A combination of separate ocean bottom stations and ocean bottom cables can be deployed. The geophone (motion sensor) and hydrophone (pressure sensor) might be connected to a recording system typically on a vessel. FIG. 2 shows another type of marine seismic surveying. A marine cable or streamer 21 incorporating pressure sensing hydrophones is designed for continuous towing through the water. A marine streamer 21 might be made up of a plurality of active or live hydrophone arrays 23 separated by spacer or dead sections 25. Usually the streamers are nearly neutrally buoyant and depth controllers 27 or depressors are attached to depress the streamer 21 to the proper towing depth. A tail buoy with a radar reflector 29 is typically attached to the end of the streamer. The entire streamer may be 3-6 Km in length and may be towed by a ship 31.

A reflection off the ocean surface gives rise to what is called a 'ghost'. When an isotropic source is fired a down-going 'source ghost' combines with the wave initially radiated in the down-going direction. This combination of two down-going waves modulates the source's amplitude spectrum by the amplitude of a sine function and results in the attenuation of low frequencies for the combined down-going wave and a reduction in the amount of information available in the seismic data. This loss of low frequencies is observed in a measurement of the combined wave's pressure and its particle motion. This invention describes sources wherein the combined down-going wave will not have its amplitude spectrum modulated in this way but instead will modulate the source's amplitude spectrum by the amplitude of a cosine function to enhance the acquisition of low frequency seismic data.

Recorded seismic data also includes a 'sensor ghost'. In the sensor case, an up-going wave reflects off the ocean surface and gives rise to a down-going sensor ghost. The sensor measures the combined up-going wave and down-going sensor ghost. This contrasts with the source case, which is a combination of two down-going waves. As an example, in a one-dimensional OBC case, a sensor ghost can be reflected off the ocean surface and delayed by the two-way travel time in the water column. The sensor ghost has the same effect on a pressure measurement as observed for the source ghost because pressure is a scalar quantity and it is not sensitive to direction. This means that a measurement of the low frequencies associated with the combined wave's pressure will be attenuated in a similar way as they would be for the source case. However, motion is a vector quantity sensitive to direction and the measurement of the combined wave's motion exhibits different behavior from that associated with the combined wave's pressure. The low frequencies associated with the combined wave's motion are retained and enhanced. Mathematically, the amplitude spectrum associated with the combined wave is modulated by the amplitude of a sine or cosine function depending on whether the wave's pressure or motion, respectively, is being measured.

When low frequencies are not available in the seismic data, impedance estimates for the subsurface derived from the seismic data will not contain low frequency information. Without low frequency information, unique solutions for impedance are not available. This hampers interpretation of the derived impedance because many unconstrained solutions are possible. Some of the impedance solutions might accurately describe the earth's impedance and others will not. If the low frequencies are retained, additional information can be incorporated into the impedance solution to reduce the nonuniqueness and to restrict attention to only the most geophysically plausible structures.

A number of methods for inserting low frequencies in the 0-10 Hz band have been developed. Some researchers have resorted to using the measured impedance at a nearby well (Galbraith, J. M., and Millington, G. F., 1979, Low frequency recovery in the inversion of seismograms: Journal of the CSEG, v. 15, p. 30-39). Another approach is to add low frequencies derived from velocity analysis (Layergne, M., and Willm, C., 1977, Inversion of seismograms and pseudovelocity logs: Geophysical. Prosp., v. 25, p. 231-250). There are also some methods by which the missing low frequency information can be estimated. One such method requires finding a reflectivity function made of isolated delta functions and another method requires predicting the missing frequencies from the band limited reflectivity function (Oldenburg, D. W., Scheuer, T., and Levy, S., 1983, Recovery of the acoustic impedance from reflection seismograms: Geophysics, v. 48, p. 1318-1337).

A major source of the lack of low frequency content in seismic data resides with the seismic acquisition system. As shown in FIG. 3, the monopole marine source array 31 radiates a wave having frequency spectrum A(f). The ocean surface 3 creates a reflection (or ghost) with frequency spectrum −A(f) that combines with the original down-going wave having the frequency spectrum A(f). The composite down-going wave (down-going plus the ocean surface reflected wave) has an amplitude spectrum with attenuated low frequencies because of destructive interference at the low frequencies. The source's amplitude spectrum will be attenuated by the amplitude of a sine function 33.

The lack of low frequency content in the seismic wave is compounded when the up-coming reflections from the subsurface are recorded by a hydrophone 35 on the surface of the seafloor 36. Hydrophone measurements are subjected to a sensor ghost that modulates the amplitude spectrum by the amplitude of a sine function 35, which attenuates the low frequencies. Geophone measurements are subjected to a sensor ghost that modulates the amplitude spectrum by the amplitude of a cosine function 37.

Even when data are recorded by a geophone on an Ocean Bottom Cable (OBC) 37, modem OBC acquisition techniques still use a source that lacks low frequency content. As described above, a principal problem in the recovery of impedance from seismograms is this lack of low frequencies in the seismic data. Accordingly, there is a need for a method and apparatus which generates low frequencies which can be measured in the seismic data. This invention satisfies these needs.

SUMMARY

A marine seismic acquisition method capable of obtaining low frequency marine seismic data is disclosed. In a first embodiment, the method comprises providing a seismic source that generates an up-going wave and a first down-going wave with opposite polarity. The up-going wave reflects off the ocean surface as a second down-going wave with the same polarity as the first down-going wave and the first and second down-going waves combine substantially in-phase to form a third down-going wave.

In a second embodiment, the method comprises creating a low frequency seismic source that radiates up-going and down-going waves through a seismic source device wherein at least part of the device is below the surface of the water. The device creates an up-going wave and a first down-going wave. The up-going wave is created substantially near the surface of the water and has enough energy to break through the surface of the water into the atmosphere, thereby there is no significant wave reflected off the surface of the water and the first down-going wave is the only significant wave produced by the source.

A marine seismic apparatus capable of retaining the low frequency marine seismic data is also disclosed. In a first embodiment, the apparatus comprises a device wherein at least part of the device is below the surface of the water. The device is adapted to cause oscillations below the surface of the water, and means for oscillating the device in the water to create an up-going wave and a first down-going wave. The up-going wave has reverse polarity relative to the first down-going wave and wherein the up-going wave becomes a second down-going wave with the same polarity as the first down-going wave after the up-going wave reflects off the surface of the water. The up-going wave and the first and second down-going waves combine substantially in-phase (at low frequencies) to form a third down-going wave.

In a second embodiment, the apparatus comprises a seismic source device wherein at least part of the device is below the surface of the water. The device creates an up-going wave and a first down-going wave. The up-going wave is substantially near the surface of the water and has enough energy to break through the surface of the water into the atmosphere and there is no significant wave reflected off the surface of the water. Therefore, the first down-going wave is the only significant down-going wave produced by the source.

BRIEF DESCRIPTION OF THE DRAWINGS

FIG. 7(*b*) is a modified marine vibrator that provides a low frequency source;

FIG. 8(*b*) is an illustration of one embodiment of an impulsive dipole source after firing.

DETAILED DESCRIPTION

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather the invention includes all alternatives, modifications, and equivalents falling within the true scope of the appended claims.

This invention is a marine seismic acquisition method and apparatus. More specifically, the method of this invention provides seismic waves containing larger frequency bandwidths (including low frequencies) than prior art methods, thereby leading to a better reflectivity estimate and an improved impedance estimate. Furthermore, with the present invention improved temporal and spatial resolution can be obtained after inversion.

Figure 1:
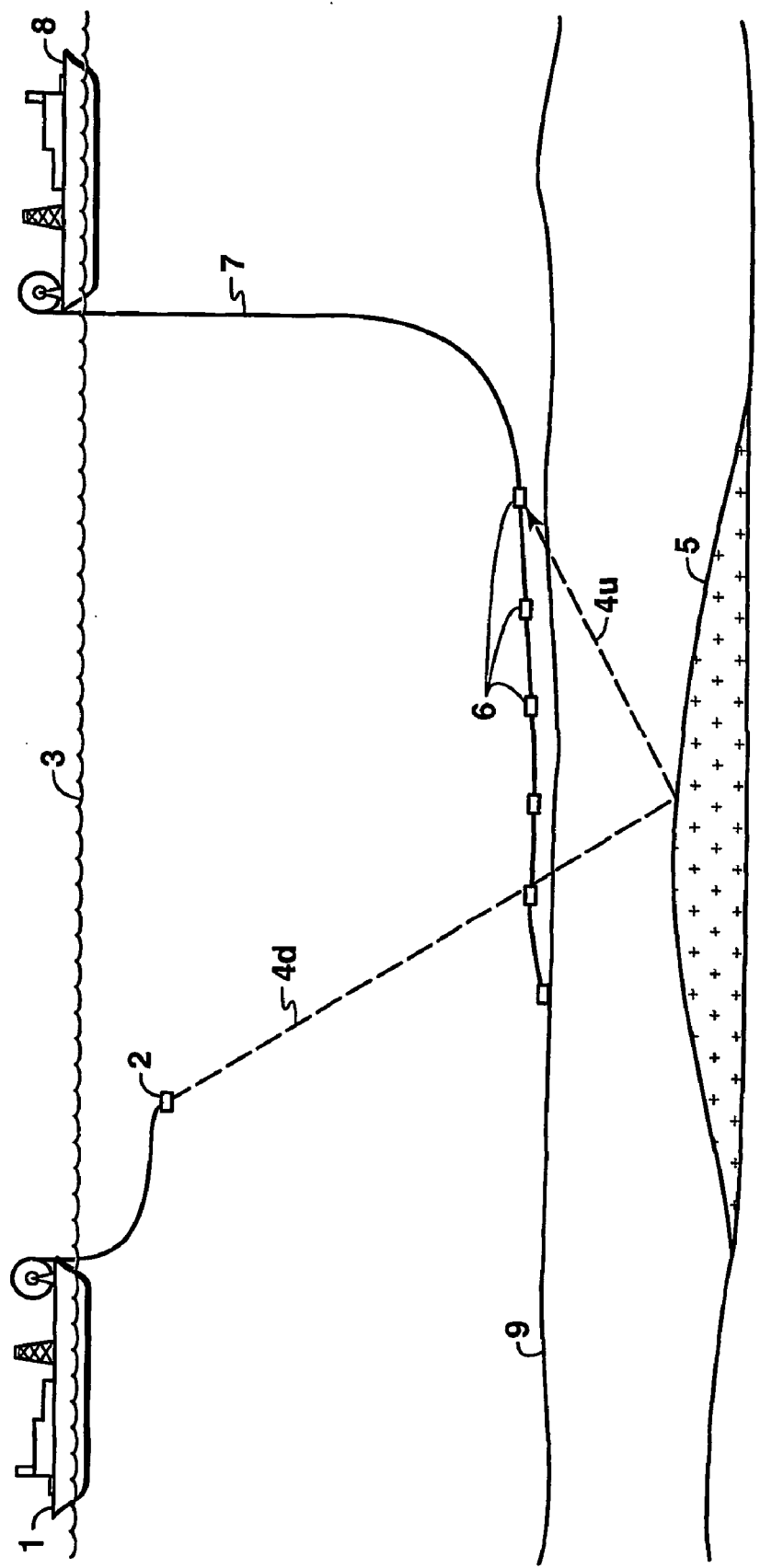
FIG. 1 shows a prior art ocean bottom cable (OBC) marine seismic acquisition system.
Figure 2:
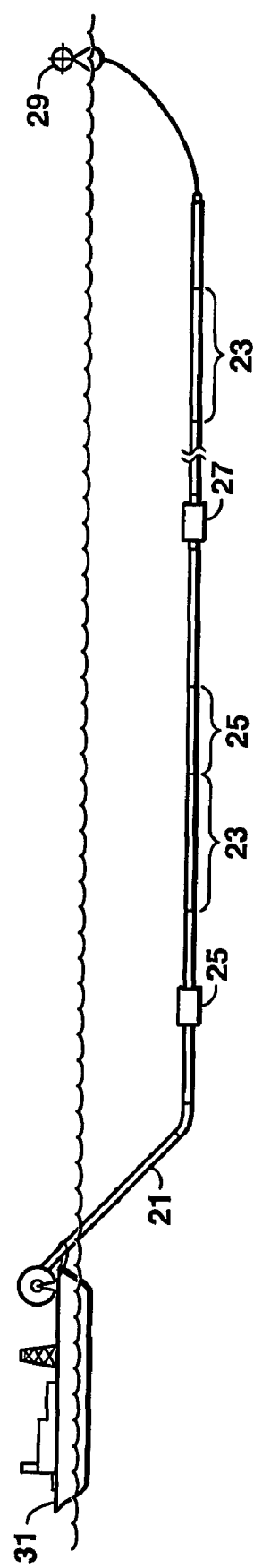
FIG. 2 shows a prior art ocean streamer cable marine seismic acquisition system.

This invention provides the ability to retain low frequencies in the wave radiated by the source and requires a sensor to measure or record the motion created by the seismic wave. The motion sensor could be a geophone on the ocean floor or some other type of motion sensor that directly measures motion in the water column. Alternatively, motion sensors might measure displacement, velocity, or acceleration (or even higher time derivatives of displacement) either on the ocean floor or in the water column. A motion sensor might utilize the Doppler shift to measure motion created by the seismic wave, or might measure the gradient of pressure and take advantage of the fact that the gradient of the pressure can be related to motion. Persons skilled in the art, based on the disclosure contained herein, could deploy a conventional marine streamer (as shown in FIG. 2) adapted to deploy motion sensors capable of detecting motion in the water.

This acquisition system can include low frequency sources in combination with the standard frequency sources to obtain seismic data over a larger frequency band. If hydrophones are used as the sensors, at least one cable should include motion sensors in order to obtain the low frequencies. For example, if the streamer had vertical motion sensors along with or instead of the pressure sensors then the acquisition system would be capable of recording low frequencies.

Figure 4:
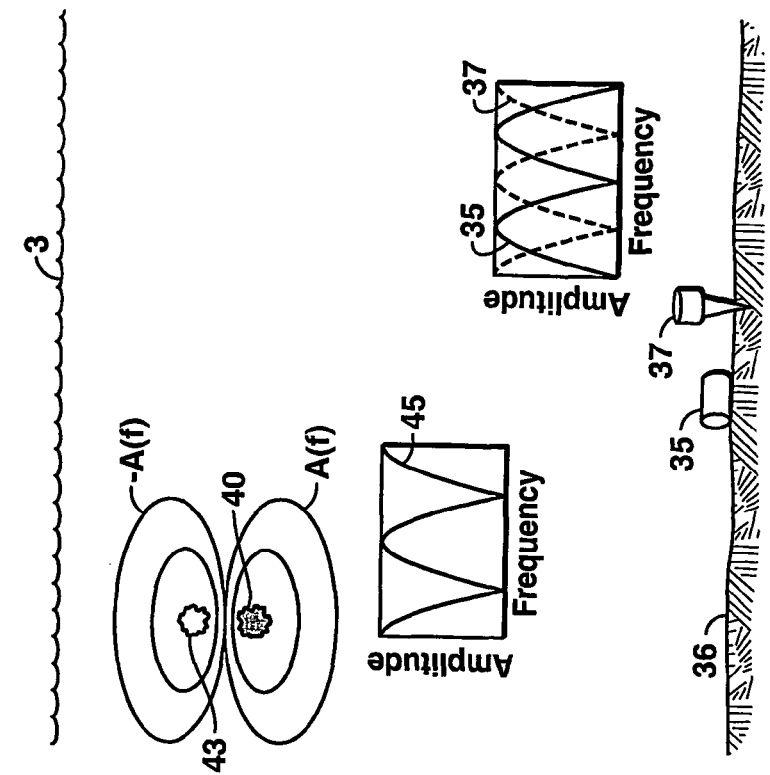
FIG. 4 illustrates the source ghosts as well as sensor ghosts for a dipole source.

FIG. 4 illustrates a dipole source capable of generating a low frequency composite down-going wave. A down-going wave is created at point 40 with an frequency spectrum of A(f) while an up-going wave is created with reverse polarity, or frequency spectrum of −A(f), at point 43. As shown in FIG. 4, one embodiment requires that the source generate an up-going wave with frequency spectrum −A(f) and down-going wave with frequency spectrum A(f) (or with opposite polarity). After the up-going wave is reflected off the ocean surface it will then have the same polarity as the down-going wave. At low frequencies these two down-going waves combine substantially in-phase. The amplitude spectrum radiated by the source will be modulated by the amplitude of a cosine function 45 shown in the amplitude versus frequency plot. Therefore, the resulting composite down-going wave will retain amplitudes at low frequencies since the low frequencies will not be attenuated by destructive interference.

Source ghosting is the interference of the first down-going wave and the second down-going wave. The source ghosting function 45 for the dipole source has an amplitude of cosine shape with maximum amplitude at zero frequency. Typically, for monopole sources such as FIG. 3, identical up- and down-going waves are radiated and the low frequency amplitudes are significantly attenuated by the amplitude of the sine function 33.

Sensor ghosting is the interference of an up-going wave from the subsurface with its reflection off the surface of the water. As discussed above, sensor ghosting is not identical for pressure 35 and motion measurements 37 sensors and, therefore, depends on the nature of the sensor. Sensor ghosting for a pressure 35 or a motion 37 sensor will attenuate or enhance, respectively, the low frequencies in seismic data.

A complete low frequency seismic acquisition system that retains the low frequencies requires two components. The first component is at least one low frequency source, radiating up- and down-going waves with opposite polarities or operating substantially near the surface wherein there is no ghost reflection because the up-going wave "blows out" into the atmosphere. The second component is at least one motion sensor to measure the seismic wave. Examples of motion sensors include, but are not limited to, displacement, particle velocity sensors or their equivalent, acceleration, higher derivatives of particle displacement, Doppler shift, and pressure gradient sensors. Ocean Bottom System (OBS) applications routinely measure motion at the sea floor and simultaneously measure the pressure (using a hydrophone). However, motion sensors could possibly be built to measure particle motion in the water column. Then the motion sensors could be positioned near the ocean surface, perhaps in a streamer.

Figure 3:
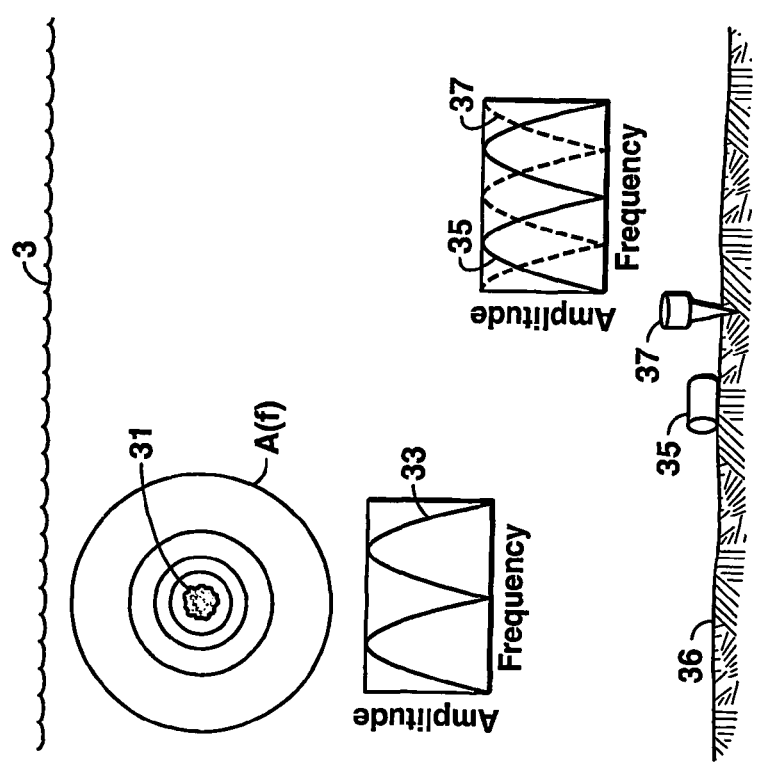
FIG. 3 illustrates the source ghosts as well as sensor ghosts for a monopole source.

The lack of low frequencies in the wave has been a direct result of the seismic acquisition systems deployed in the field. First, marine seismic sources do not typically radiate between 0-10 Hertz (Hz). The source array must generate the low frequencies if they are to be received. However, typical marine seismic source arrays utilize individual elements that radiate isotropically (as shown in FIG. 3). The ghost effect creates a notch in the amplitude spectrum at low frequencies that prohibits low frequencies from being radiated in the downward direction. One solution is for the source to be generated so that the up-going wave from the source has reverse polarity with the wave radiated in the down-going direction (for example, the acquisition source radiates (oscillates) like an out-of-phase 'dipole').

Figure 5:
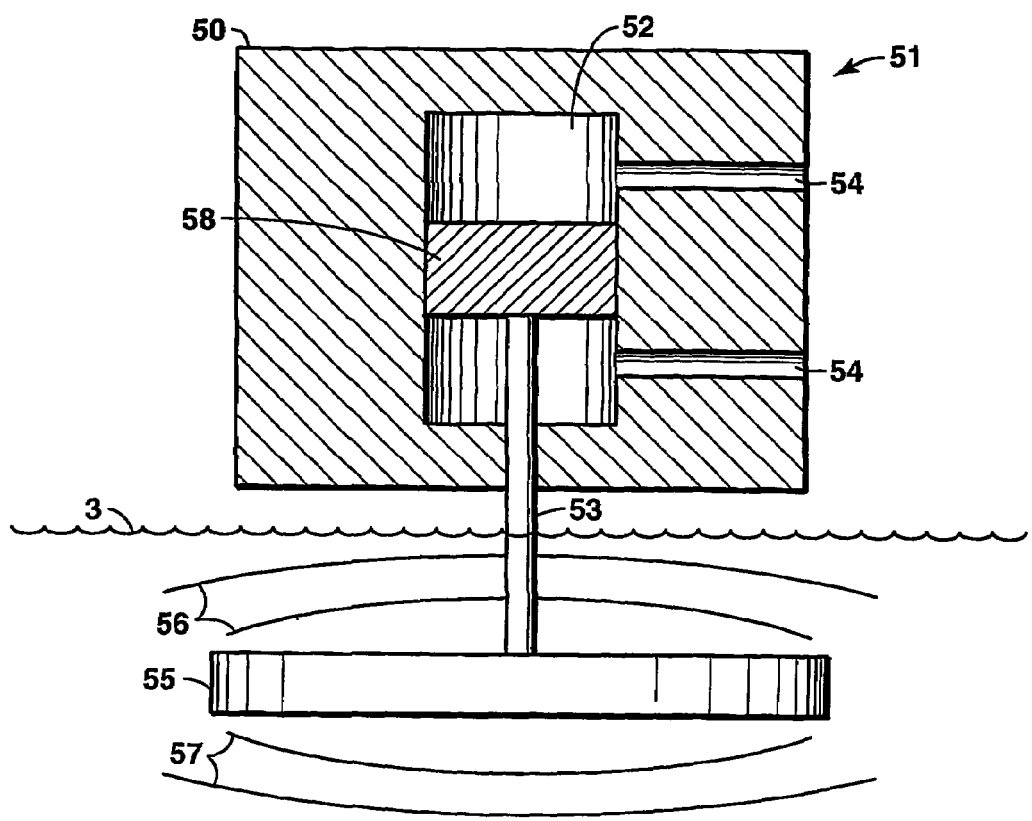
FIG. 5 is a low frequency vibrator source.

As shown in FIG. 5, one possible marine seismic source apparatus 51 is constructed like a land vibrator with the reaction mass 50 suspended by a crane (not shown) or floats. The reaction mass must be heavy enough to stabilize the vibrator baseplate 55 as it vibrates in the water. A vibrator baseplate 55 made out of a rigid material (typically metal) would be below the ocean surface 3 at a typical depth for a marine source. Inside the reaction mass 50 is a cylinder 52 housing a piston 58. The piston 58 would be rigidly connected 53 to the baseplate 55 while the cylinder 52 is part of the reaction mass 50. When the vibrator plate 55 is pushed down (such as, by a hydraulic system 54 with fluid pressure controlled by valves connected to the cylinder) a compression wave 57 is radiated downward and a rarefaction wave 56 is radiated upward. The compression wave 57 radiated downward is a first down-going wave and the rarefaction wave 56 radiating upward is an up-going wave. The up-going wave 56 would have reverse polarity relative to the down-going wave 57.

The vibrator shown in FIG. 5 can be adapted to radiate in a manner required to produce low frequency waves thus providing a source for a low frequency marine seismic acquisition system. For vibrators in use today the cylinder height is too short to provide the stroke length required for the desired low frequencies. When this height is increased the hydraulic system will have to be redesigned to meet the new requirements. Persons skilled in the art, based upon the disclosure contained herein, can redesign the hydraulic system to achieve the new requirements.

Figure 6:
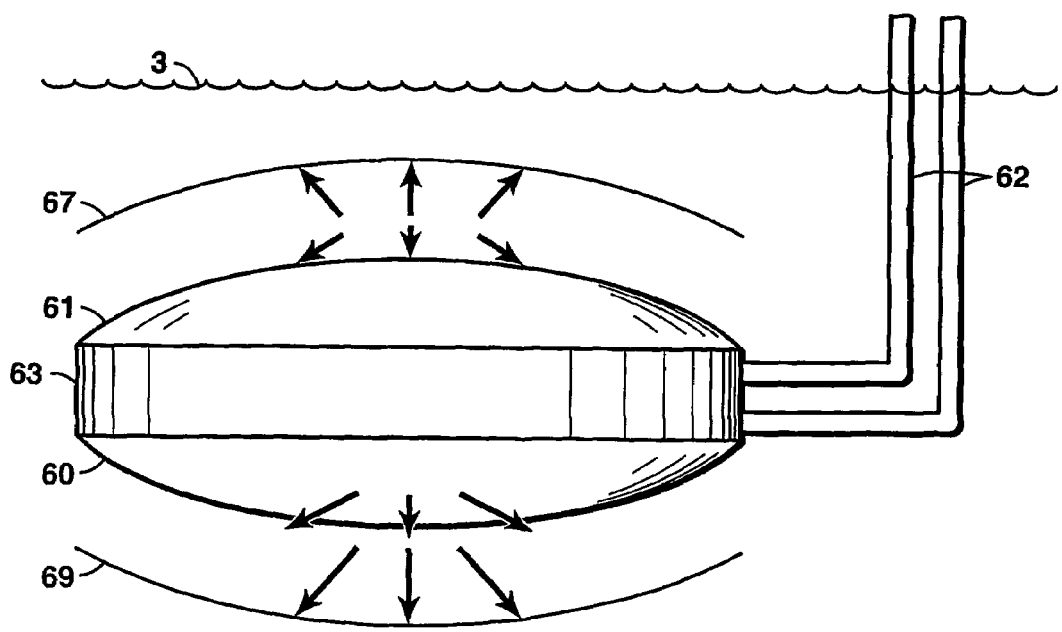
FIG. 6 is a low frequency dipole source using flexible membranes.

Another possible low frequency source apparatus embodiment, as shown in FIG. 6, is to employ flexible membranes (comprising at least one lower membrane 60 and at least one upper membrane 61) attached to a supporting frame 63. The membranes would move with one another (as shown in the Figure), wherein as the upper membrane 61 is collapsing the lower membrane 60 is expanding. Therefore, the up-going wave 67 has reverse polarity relative to the down-going wave 69. The power source 62 could be hydraulic, pneumatic, or electrical. The power source 62 is adapted to alternately provide fluid pressure or electricity to at least one drive mechanism (not shown) of the upper 61 and lower membranes 60. A supporting frame 63 would preferably enclose the drive mechanisms that are necessary to provide the desired membrane movement.

Figure 7B:
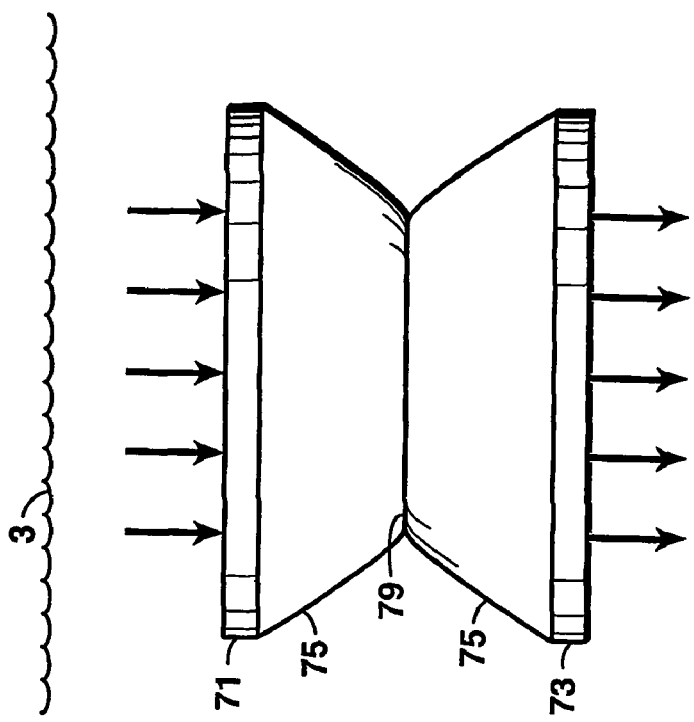
FIG. 7(*a*) is a conventional marine vibrator.
Figure 7A:
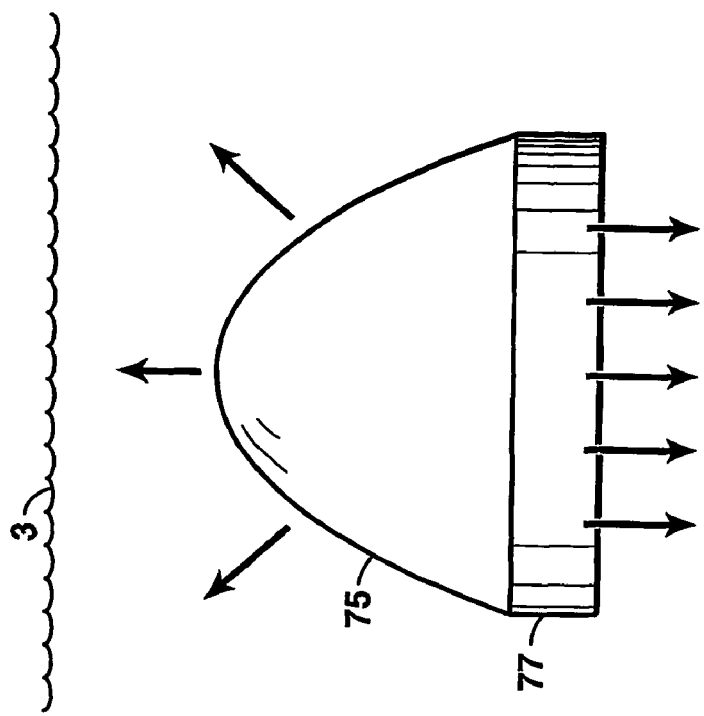

As shown in FIG. 7(a), a conventional marine vibrator consists of an upper bell or backside 75 and lower baseplate 77 that vibrates in-phase (both the backside and baseplate expand and contract together) thus creating a monopole source. However, as shown in FIG. 7(b), another potential low frequency seismic source apparatus requires employing two marine vibrators comprising at least an upper vibrator plate 71 and at least one lower vibrator plate 73 operating as a dipole source. The backsides 75 or bells of the vibrators would be preferably attached to each other and the backsides would be engineered to remain stationary during operation. The upper 71 and lower 73 vibrator plates vibrate in the same direction at the same time. Whereas, as the upper vibrator is vibrating towards its backside the lower vibrator is vibrating away from its backsides and as the lower vibrator is vibrating towards its backside the upper vibrator is vibrating away form its backside. Therefore, the up-going wave produced from the upper vibrator plate 71 has reverse polarity with the first down-going wave produced from the lower vibrator plate 73 providing a seismic source capable of retaining the lower frequencies.

Figure 8A:
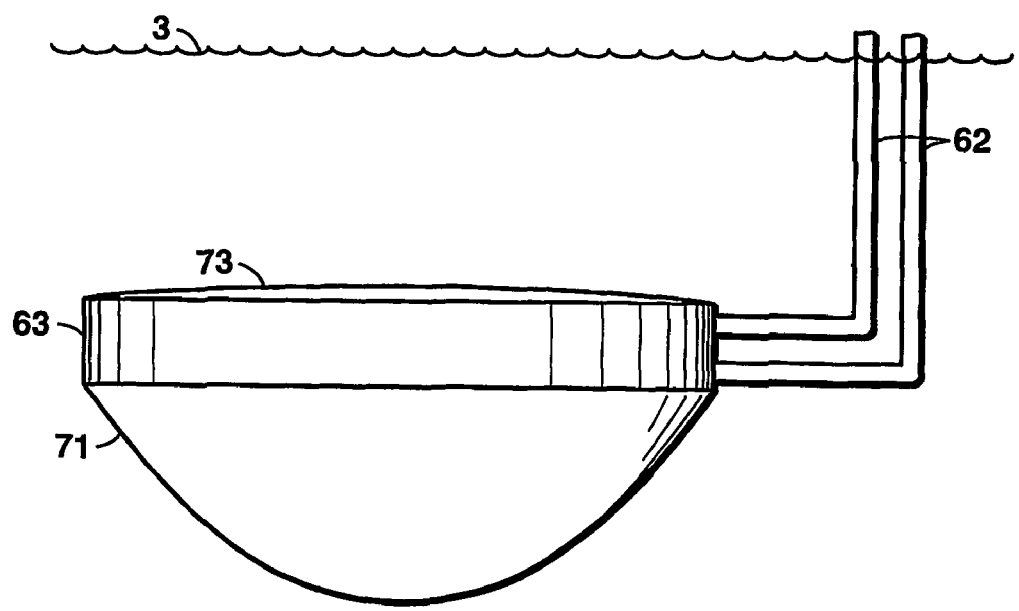
FIG. 8(*a*) is an illustration of one embodiment of an impulsive dipole source before firing.

A possible source would also be an impulsive source. An impulsive source embodiment, as shown in FIG. 8(a), consists of upper 73 and lower 71 membranes attached to a rigid supporting frame 63. The frame is adapted to control airflow from one membrane to another. Possible methods for permitting controlled airflow include air ports, valves, and other devices known in the art. FIG. 8(a) shows the device before being fired. The source is fired when high-pressure air initially trapped by the lower membrane 71 is vented upward while being then trapped by the upper membrane 73. The air is quickly released causing the upper membrane 73 to rapidly expand and the lower membrane to rapidly collapse.

Figure 8B:
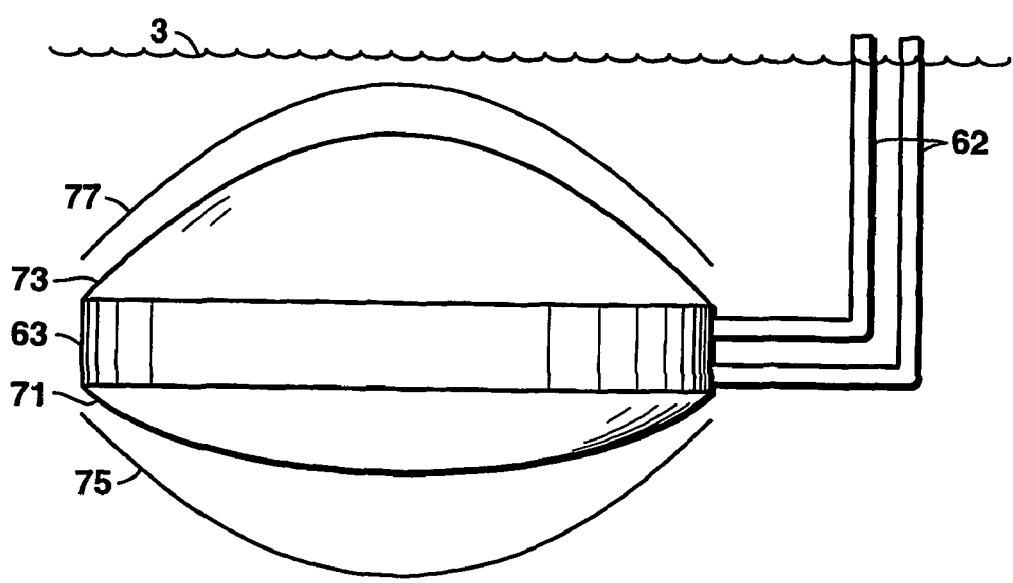

As shown in FIG. 8(b) the collapsing lower membrane 71 creates a down-going wave 75 that has reverse polarity relative to the up-going wave 77 created by the expanding upper membrane 73. In this example, the high-pressure air is vented from below the rigid supporting frame 63 to above the rigid supporting frame 63. However, the direction of the airflow can be reversed so that the air is released from above the rigid supporting frame 63 to below the rigid supporting frame 63. This embodiment requires one membrane to collapse while the other membrane expands to create and up-going wave 77 that has reverse polarity with the down-going wave 75. Another embodiment would be to use only one membrane, either 71 or 73, to initially confine the high-pressure air and then vent the high-pressure air directly into the ocean either above or below the rigid supporting frame 63 depending on whether the membrane 71 or 73 is below or above, respectively, the rigid supporting frame 63.

Another possible low frequency source apparatus embodiment comprises a supporting frame in the shape of a large plate which serves as both a reaction mass and backplane. The plate is positioned horizontally in the water at a typical source depth and contains one or many vertically moving pistons. The motion of the piston(s) act to compress water on one side of the plate while simultaneously rarefying water on the other side, thus radiating waves of opposite polarity on either side of the plate.

Another potential low-frequency source would be a conventional source located near the surface of the water. The source would be designed to be powerful enough for the up-going wave to substantially break through ("blow-out") the interface of the surface of the water into the atmosphere so that no significant amount of the up-going wave would be reflected off the surface of the water. Therefore, with no significant reflected wave, the only significant wave would be the original down-going wave. The down-going wave would contain the original low frequencies of the source and would not be affected by the combination of the source ghost so long as no significant portion of the up-going wave was reflected.

An example of one possible source is an airgun located near the surface of the water. The airgun would require a charge powerful enough wherein the air pocket created blows-out of the water into the atmosphere thus creating a down-going wave in the water but no significant up-going wave in the water since most of the air pocket escaped into the atmosphere.

EXAMPLE

For the example discussed below, source ghosting for the particle velocity and pressure is considered by assuming a location far removed from the source and vertically below the source. Furthermore, the upward direction is considered positive and the impedance of the medium is uniform. Based on the above assumptions the equations for pressure and particle velocity are written as follows:

$$P=U+D \qquad (1)$$

$$V=U-D \qquad (2)$$

wherein U and D are the up-going and down-going waves, respectively. In this hypothetical example, there is no up-going wave so P=−V. Therefore, the amplitude spectra of the pressure and particle velocity are identical regardless of the detailed nature of the source ghosting.

Consider an ordinary source array in an infinite medium. The source radiates a wave with frequency spectrum A(f) (f is frequency). Now consider the same source operating near the ocean surface, as shown in FIG. 3. The part of the wave radiated from the source 31 towards the ocean surface 3 reflects off the ocean surface 3 and radiates downward with the same frequency spectrum but opposite polarity. The actual down-going source pulse or third down-going wave, S(f), generated with ghosting is $$S(f)=A(f)[1-e^{-j4\pi fd/V_p}] \qquad (3)$$

In this equation, d is the depth of the source, f is the frequency, j is the square root of −1, $V_p$ is the propagation velocity in the ocean, and the assumed reflection coefficient off the ocean surface is −1. If the source is so near to the surface that the up-going wave 'blows out' into the atmosphere then S(f)=A(f). If the up-going wave does not "blow-out" into the atmosphere, then S(f) is given by 3quation 3. Equation 3 can also be expressed as:

$$S(f)=2jA(f)\sin(2\pi fd/V_p)e^{-j2\pi fd/V_p} \qquad (4)$$

Thus, ghosting 33 modulates |A(f)| by |2 sin(2 πfd/V$_p$)|. This modulation attenuates the low frequency amplitudes identically for the pressure and particle velocity.

Now referring to FIG. 4, if the frequency spectrum of the initial down-going wave from source 40 is A(f) then the up-going source 43 wave is −A(f). Ghosting of this type of source will actually enhance the low frequencies and lead to improved signal-to-noise ratio at the low frequencies. Furthermore, the invention provides increased frequency bandwidth and improved signal-to-noise ratio in other parts of the frequency band by reducing the destructive interference of the ghost. Therefore, while this invention is primarily directed for obtaining low frequencies, the embodiments should not be limited to low frequencies but can be used to obtain seismic data throughout the frequency band. The composite down-going source pulse after ghosting:

$$S(f)=A(f)[1+e^{-j4\pi fd/V_p}] \quad (5)$$

which can be expanded and expressed as:

$$S(f)=2A(f)\cos(2\pi fd/V_p)e^{-j2\pi fd/V_p} \quad (6)$$

Thus ghosting for a dipole source modulates |A(f)| by |2 cos(2πfd/V$_p$)| which actually enhances lower frequencies.

A sensor that records particle velocity, or its equivalent, must be used in this low frequency marine acquisition system. Unlike source ghosting, sensor ghosting is different for pressure (P) and particle velocity (V). As an example, consider an OBC array with a hydrophone and vertical geophone co-located on the ocean floor. For illustration purposes only, the actual source is ignored and the source of the up-going wavefield is assumed to be far removed at a downward location. In this scenario, the down-going wave (D) at the ocean bottom is represented as equation 7:

$$D=-UZ \quad (7)$$

where Z is the phase delay and U is the up-going wave. The pressure and particle velocity measurements would be represented as equations 8 and 9:

$$P=U[1-Z] \quad (8)$$

$$V=U[1+Z] \quad (9)$$

The phase delay equation associated with two-way propagation time, $\tau_W$, in the water column is represented as:

$$Z=\exp(-j2\pi f\tau w) \quad (10)$$

Equations 8 and 9 show that the sensor ghosting is different for P and V. In order to retain the low frequencies, particle velocity, or its equivalent, must be recorded as part of this invention. Expanding equation 9 in the same way as equation 5 demonstrates that low frequencies are preserved by recording V.

$$V=U[1+\exp(-2j\pi f\tau_w)] \quad (11)$$

Resolution Improvement

Temporal resolution has been defined to be the product of the root-mean-square pulse length and bandwidth (Trantham, E. Clark, 1993, Minimum uncertainty filters for pulses: Geophysics, v. 58, p. 853-862). This uncertainty is a measure of how efficiently a given bandwidth is used to produce a short wavelet. It has been documented that a wavelet can be represented as a superposition of Hermite functions, and that a wavelet should be the lowest order Hermite function to minimize its uncertainty (Trantham, E. Clark, 1993, Minimum uncertainty filters for pulses: Geophysics, v. 58, p. 853-862). The lowest order Hermite function is a Gaussian, which has a non-zero value at zero frequency.

The Gaussian wavelet is typically not available in seismic data. However, the data may be obtainable from the improved measurement capabilities of the invention. Without zero frequency the optimal minimum uncertainty wavelet for seismic data is a first derivative Gaussian. However, after inversion of the seismic data, it is possible that auxiliary data can then be used to fill in the lowest frequencies including zero frequency (not in the original seismic data) so that the wavelet after inversion can be shaped to a Gaussian. Persons skilled in the art can minimize uncertainty through this process and gain a factor of three improvement in resolution with the present invention.

What is claimed is:

1. A marine seismic source method, the method comprising;
   generating an up-going and down-going wave that are substantially 180° out of phase, wherein the up-going wave reflects off the ocean surface as a second down-going wave having the same polarity as the first down-going wave wherein the first and second down-going waves combine substantially in-phase to form a third down-going wave.

2. The method of claim 1 further comprising detecting seismic waves produced from the seismic source with at least one motion sensor, or with both motion sensors and pressure sensors.

3. The method of claim 1 wherein the generated up-going wave, the first down-going wave, and the third down-going wave contain frequencies of less than 10 Hz.

4. The method of claim 2 wherein the motion sensors are selected from the group consisting of displacement, velocity, acceleration, higher derivatives of particle displacement, Doppler shift, pressure gradient sensors, and any combination thereof.

5. The method of claim 2 further comprising an inversion applied to the recorded seismic data to reduce wavelet uncertainty.

6. A marine seismic source apparatus comprising:
   a seismic source device wherein at least part of the device is below the surface of the water and the device is adapted to cause oscillations below the surface of the water;
   means for causing oscillations in the water to create an up-going wave and a first down-going wave that are substantially 180° out of phase wherein the up-going wave becomes a second down-going wave with the same polarity as the first down-going wave after the up-going wave reflects off the surface of the water and the first and second down-going waves combine substantially in-phase to form a third down-going wave.

7. The apparatus of claim 6 wherein the up-going waves, the first down-going waves, and the third down-going waves contains frequencies of less than 10 Hz.

8. The apparatus of claim 6 wherein the device is a vibrating baseplate below the surface of the water and the means for causing oscillations in the water is a reaction mass above the ocean surface, the reaction mass housing a piston and a corresponding cylinder, the piston rigidly attached to the baseplate, the piston adapted to oscillate along the long axis of the cylinder when activated and means for activating the piston wherein as the vibrating baseplate is pushed down a compression wave is radiated as a down-going wave and a rarefaction wave is radiated as an up-going wave, wherein the compression wave is the first down-going wave and the rarefaction wave is the up-going wave.

9. The apparatus of claim 8 wherein the means for activating the piston is a hydraulic system with fluid pressure from valves connected to the cylinder.

10. The apparatus of claim 6 wherein the up-going wave, the first down-going wave, and the third down-going wave contain frequencies of less than 10 Hz.

11. The apparatus of claim 6 wherein the device is at least two flexible membranes below the surface of the water comprising at least one upper and at least one lower membrane and the means for causing oscillations in the water is a supporting frame connected to the membranes, the supporting frame containing at least one drive mechanism adapted to oscillate the upper and lower membranes wherein the upper membrane oscillates out-of-phase with the lower membrane thereby generating an up-going wave from the upper membrane that has reverse polarity respective to the first down-going wave generated from the lower membrane.

12. The apparatus of claim 11 wherein at least one drive mechanism is chosen from the group consisting of a hydraulic source, a pneumatic source, an electrical source, and any combination thereof.

13. The apparatus of claim 11 wherein the up-going wave, the first down-going wave and the third down-going wave contains frequencies of less than 10 Hz.

14. The apparatus of claim 6 wherein the device is at least two flexible membranes below the surface of the water comprising at least one upper and at least one lower membrane, and the means for creating oscillations in the water is a rigid frame, the upper and lower membrane connected to the rigid frame, the rigid frame adapted to controllably permit airflow from one membrane to another membrane and the membranes are adapted to expand when air enters a membrane and contract when air exits a membrane wherein an up-going wave is formed from the upper membrane that has reverse polarity to the first down-going wave from the lower membrane that is operating out-of-phase with the upper membrane.

15. The apparatus of claim 14 wherein the up-going wave, the first down-going wave, and the third down-going wave contains frequencies of less than 10 Hz.

16. The apparatus of claim 6 wherein the device is at least two marine vibrators comprising at least one upper marine vibrator that vibrates out-of-phase with at least one lower marine vibrator wherein the upper marine vibrator radiates an up-going wave that has reverse polarity to the first down-going-wave that radiates from the lower marine vibrator and the backsides of the vibrators are stationary during operation of the vibrators.

17. The apparatus of claim 16 wherein the up-going wave, the first down-going wave, and the third down-going wave contains frequencies of less than 10 Hz.

18. The apparatus of claim 16 wherein the backsides of the upper and lower vibrators are connected.

19. The apparatus of claim 6 wherein the device is a rigid plate which serves as reaction mass and backplane below the surface of the water and the means for causing oscillations in the water is at least one pistons and at least one corresponding cylinder through the plate and oriented normal to the large surfaces of the plate, the piston pushing directly on the water, the piston adapted to oscillate along the axis of the cylinder when activated and means for activating the piston wherein as at least one piston is pushed down a compression wave is radiated as a down-going wave and rarefaction wave is radiated as an up-going wave, wherein the compression wave is the first down-going wave and the rarefaction wave is the up-going wave.

20. The apparatus of claim 19 wherein the up-going wave, the first down-going wave, and the third down-going wave contains frequencies of less than 10 Hz.

* * * * *